United States Patent [19]

Bender et al.

[11] Patent Number: 5,512,309

[45] Date of Patent: * Apr. 30, 1996

[54] PROCESS FOR TREATING POULTRY CARCASSES TO INCREASE SHELF-LIFE

[75] Inventors: Fredric G. Bender, McMurry, Pa.; James T. Elfstrum, Cranbury, N.J.

[73] Assignee: Rhone-Poulenc Inc., Princeton, N.J.

[*] Notice: The portion of the term of this patent subsequent to Dec. 3, 2008, has been disclaimed.

[21] Appl. No.: 380,475

[22] Filed: Jan. 30, 1995

Related U.S. Application Data

[63] Continuation of Ser. No. 171,795, Dec. 22, 1993, abandoned, which is a continuation-in-part of Ser. No. 938,864, Aug. 31, 1992, Pat. No. 5,283,073, which is a continuation-in-part of Ser. No. 712,260, Jun. 7, 1991, Pat. No. 5,143,739, which is a continuation-in-part of Ser. No. 530,131, May 29, 1990, Pat. No. 5,069,922, which is a continuation of Ser. No. 308,357, Feb. 9, 1989, abandoned.

[51] Int. Cl.$^6$ .................... A22C 21/00; A23B 4/027; A23L 1/315

[52] U.S. Cl. .................... 426/332; 426/335; 426/532; 426/644

[58] Field of Search .................... 426/332, 335, 426/532, 644, 652; 514/143

[56] References Cited

U.S. PATENT DOCUMENTS

| | | | |
|---|---|---|---|
| Re. 30,023 | 6/1979 | Hawley et al. | 426/266 |
| 1,774,310 | 8/1930 | Bates . | |
| 2,770,548 | 11/1956 | Hall et al. . | |
| 2,957,770 | 10/1960 | Freund et al. . | |
| 3,493,392 | 2/1970 | Swartz . | |
| 3,615,686 | 10/1971 | England . | |
| 3,620,767 | 11/1971 | Swartz . | |
| 3,681,091 | 8/1972 | Kohl et al. . | |
| 3,705,040 | 12/1972 | Bynagte . | |
| 3,726,962 | 4/1973 | Vanstrom et al. | 423/306 |
| 3,775,543 | 11/1973 | Zyss | 426/281 |
| 3,782,975 | 1/1974 | Zyss | 426/281 |
| 3,989,851 | 11/1976 | Hawley et al. | 426/266 |
| 4,071,635 | 1/1978 | Lindl et al. | 426/264 |
| 4,075,357 | 2/1978 | Szczesniak et al. | 426/332 |
| 4,168,322 | 9/1979 | Buckley et al. | 426/250 |
| 4,293,578 | 10/1981 | Stone | 426/332 |
| 4,342,790 | 8/1982 | Katoh et al. | 426/332 |
| 4,382,098 | 5/1983 | Bolin et al. | 426/646 |
| 4,407,831 | 10/1983 | Swartz | 426/281 |
| 4,431,679 | 2/1984 | Crawford | 426/332 |
| 4,517,208 | 5/1985 | Crawford | 426/332 |
| 4,592,892 | 6/1986 | Ueno et al. | 422/28 |
| 4,683,139 | 7/1987 | Cheng | 426/265 |
| 4,683,618 | 8/1987 | O'Brien | 127/51 |
| 4,770,784 | 9/1988 | Davis et al. | 210/638 |
| 4,781,934 | 11/1988 | Shimp et al. | 426/264 |
| 4,810,514 | 3/1989 | Guenther | 426/513 |
| 4,849,237 | 6/1989 | Hurst | 426/332 |
| 5,192,570 | 3/1993 | Bender et al. | 426/332 |
| 5,268,185 | 12/1993 | Bender et al. | 426/92 |

FOREIGN PATENT DOCUMENTS

| | | |
|---|---|---|
| 847280 | 7/1970 | Canada . |
| 935413 | 8/1963 | United Kingdom . |
| 1339503 | 12/1973 | United Kingdom . |

OTHER PUBLICATIONS

"Effects of Type and Concentration of Phosphate and Amount of Salt and Brine on WHC, Color and Consistency of Cooked Meat Products," G. Barbieri, et al., Industria Conserve 1989, 64:313.

"The Influence of Scald Water pH on the Death Rates of *Salmonella typhimurium* and Other Bacteria Attached to Chicken Skin," T. J. Humphrey, et al., Journal of Applied Bacteriology 1984, 57(2), pp. 355–359.

"The Effect on pH Adjustment on the Microbiology of Chicken Scald-tank Water with Particular Reference to the Death Rate of Salmonellae," T. J. Humphrey, et al., Journal of Applied Bacteriology 1981, 51, pp. 517–527.

"Phosphate and Heat Treatments to Control Salmonella and Reduce Spoilage and Rancidity on BroilerCarcasses," J. E. Thompson, et al., Poultry Science 1979, 58, pp. 139–143.

*Chemical Pasteurization of Poultry Meat*, J. S. Teotia, Dissertation Abstracts Int'l. B. 1974, 34(a), p. 4142.

*The Antimicrobial Effect of Phosphate With Particular Reference to Food Products*, L. L. Hargreaves, et al., The British Food Manufacturing Industries Research Association, Scientific and Technical Surveys, No. 76, Apr. 1972, pp. 1–20 at 12.

Grant, Hackh's Chemical Dictionary, 4th edition, McGraw Hill Company, New York, 1969, p.514.

*Bacteriolytic Action of Phosphates*, G. Pacheco, et al., Mems Institute Oswaldo Cruz, 52(2), pp. 405–414.

"Chemicals Used in Food Products," National Academy of Sciences, National Research Counsel, Publication 1274 (1965).

Primary Examiner—Arthur L. Corbin
Attorney, Agent, or Firm—Andrew M. Soloman

[57] ABSTRACT

Increased shelf-life is obtained by treating poultry carcasses with a treatment solution containing an alkali metal orthophosphate, e.g., trisodium orthophosphate, prior to chilling.

11 Claims, No Drawings

PROCESS FOR TREATING POULTRY CARCASSES TO INCREASE SHELF-LIFE

This application is a continuation of Ser. No. 171,795, Dec. 22, 1993, now abandoned, which is a continuation-in-part of application Ser. No. 938,864, Aug. 31, 1992, U.S. Pat. No. 5,283,073, which is a continuation-in-part of application Ser. No. 712,260, Jun. 7, 1991, U.S. Pat. No. 5,143,739, which is a continuation-in-part of application Ser. No. 530,131, May 29, 1990, U.S. Pat. No. 5,069,922 which is a continuation of application Ser. No. 308,357, Feb. 9, 1989, abandoned.

The present invention relates to an improved process for reducing the level of and retarding the growth of bacteria, such as salmonella, in poultry processing and on raw poultry without causing organoleptic depreciation thereof and, in turn, extending the shelf-life of the poultry.

BACKGROUND OF THE INVENTION

Poultry is processed, after slaughtering, by scalding to assist in defeathering, defeathering by machine, washing, eviscerating and chilling prior to packing. These treatments are controlled to avoid causing a change in the appearance characteristics of poultry which would make it unsalable. Poultry, after eviscerating, shows high levels of salmonella bacteria on the surface of the carcass. A large part of carcass contamination with salmonella can be removed by water washing. While salmonella can be easily killed by heat, such as during cooking, colony forming units of bacteria can attach and/or reside in the regular and irregular surfaces of the skin, multiply and, thereafter, contaminate working surfaces, hands and utensils. Food spoilage and illness can result from this carry over of bacteria or cross-contamination from the infected carcass to surfaces not heated sufficiently to cause thermal destruction of the bacteria.

Extensive research has been conducted by the art to uncover an economical system for reducing salmonella contamination of poultry carcasses without causing organoleptic depredation. Poultry feathers carry large amounts of salmonella which can contaminate the carcass during scalding and defeathering. Improper evisceration can also be a source of contamination. The use of acids such as lactic or acetic acid, at levels sufficient to effect bacteriological control, causes organoleptic deterioration of the poultry. At acid levels low enough to avoid organoleptic deterioration of the poultry, bacteriostatic effects are reduced. A treatment system must be economical, easy to use, compatible with food manufacturing, and not change the organoleptic properties of the poultry. Any change in the appearance of the poultry would make the same unsalable.

It has been reported that the thermal death rate of salmonella can be increased during scalding by elevating the pH of the scald water to pH 9.0±0.2. Agents such as sodium hydroxide, potassium hydroxide, sodium carbonate, and trisodium phosphate have been reported as effective pH adjusting agents for use in increasing the thermal death rate of the bacteria. Trisodium phosphate was reported as least effective in increasing the death rate. Sodium hydroxide and potassium hydroxide, while effective bacteriostats, can effect the surface of the carcass adversely. Propionic acid and glutaraldehyde, which were also tried as treating agents, are reported as possibly having unfavorable effects on plucking. See, "The Effect of pH Adjustment on the Microbiology of Chicken Scald-tank Water With Particular Reference to the Death Rate of Salmonella," T. J. Humphrey, et al., *Journal of Applied Bacteriology*, 1981, 51, pp. 517–527.

T. J. Humphrey, et al. have also reviewed the pH effect of scald water on salmonella on chicken skin. See "The Influence of Scald Water pH on the Death Rates of *Salmonella typhimurium* and Other Bacteria Attached to Chicken Skin," *Journal of Applied Bacteriology*, 1984, 57 (2), pp. 355–359. Scald water adjusted to pH 9±0.2 as in the 1981 paper can help to reduce external and internal cross-contamination of carcasses by salmonellas.

The results reported in the first article are based on assays of samples of scald water taken from the scald tank. The article does not show the effect of the agents on bacterial colonies on the surface of the poultry or the organoleptic effect on the poultry meat or skin.

The second paper teaches that pH adjustment of scald water to pH of 9±0.2 can be used to improve the hygiene of chicken carcasses during plucking by lowering the bacterial carry over from the scald tank.

These references are limited to the scald tank and use relatively low pH conditions and low concentration pH adjusting agents and do not show any long term effect of the agents on the surface of the poultry since the scald water solution and any agents therein are washed off after defeathering.

Humphrey, et al. recognize that plucking and subsequent evisceration cause further contamination. The improvements in scalding hygiene reported in their 1984 paper and in their earlier work [1981] help to reduce the growth rate of pathogens on carcass surfaces during plucking but have no measurable effect on the shelf-life or safety of chilled carcasses because of further contamination during evisceration. The organisms responsible for spoilage of meat of this type are added during cold storage or during later stages of processing. (Humphrey, et al. 1984 at page 359). Humphrey, et at. do not teach reducing the potential for salmonellosis by reducing the incidence and population of salmonella organisms. Humphrey, et al., 1984, also do not show the organoleptic effect of their treatment on the poultry carcasses, much of which is undesirable.

Attempts have been made to pasteurize poultry meat by treating the meat with a solution containing agents such as lactic acid, acetic acid, sodium carbonate, sodium borate, sodium chloride, potassium hydroxide, chlorine and EDTA. All treatments, except sodium borate, sodium chloride and sodium carbonate reduced the visual acceptability of the meat. Chlorine failed to destroy bacteria on the surface of the poultry but would be expected to control salmonella in water. See, *Chemical Pasteurization of Poultry Meat*, J. S. Teotia, Dissertation Abstracts Int'l. B., 1974, 34(a), 4142.

The following references treat various meat products to retain moisture, texture and tenderness. U.S. Pat. No. 3,782,975 to Zyss issued Jan. 1, 1974 teaches polyphosphate curing of fresh primal cuts of meat with a curing solution at pH 6 to 8, free of sodium, and containing about 1.0 to 20% by weight of a water soluble phosphate which can include orthophosphate.

U.S. Pat. No. 3,775,543 to Zyss issued Nov. 27, 1973 uses 0.2 to 20% by weight of a phosphate (which can be orthophosphate) treatment solution based on the ingredient mix of processed meat. The phosphate is used as a binding agent. Alkaline pH is found to decrease shelf-life. Salmonella is killed by cooking not by phosphate.

U.S. Pat. No. 3,493,392 to Swartz issued Feb. 3, 1970 pumps tuna with a phosphate treating solution including orthophosphate to improve yield of desired light flesh, to improve odor (less fishy) and to render the meat more tender and less dry. Pumping injects solution deep into the meat or fish and is not a surface treatment. Swartz uses mono and dialkali orthophosphate in Example IV and reports poor weight retention results compared to polyphosphates. U.S. Pat. No. 3,620,767 to Swartz issued Nov. 16, 1971 pumps bonito with a salt and phosphate including orthophosphate but no example is given. See also Canadian Patent 847,280 issued Jul. 21, 1970 to Swartz. These references employ polyphosphates for their water binding properties.

U.S. Pat. No. 2,770,548 teaches the anticaking properties of trialkali metal orthophosphates.

Trisodium phosphate has also been found to be effective in inhibiting the growth of blue mold in cuts and bruises in fruit by treating the broken surface with the solution of trisodium phosphate (U.S. Pat. No. 1,744,310).

Kohl, et al., U.S. Pat. No. 3,681,091, issued August 1, 1972, teaches treating foods including fish fillets with 10% solution of medium chain length polyphosphates.

Freund, et al., U.S. Pat. No. 2,957,770 teach improving the properties of meat with a composition which can include inorganic orthophosphates such as disodium hydrogen orthophosphate. Low concentrations of phosphate are employed.

Cheng, U.S. Pat. No. 4,683,139 issued Jul. 28, 1987 teaches a process for prepackaged fresh red meat at retail wherein the shelf-life of the meat is increased by treatment with an aqueous solution of an alkali metal salt or certain phosphate compounds, a reducing compound such as ascorbic acid and a sequestering or chelating agent such as citric acid. The phosphate can be an orthophosphate, pyrophosphate, tripolyphosphate and hexametaphosphate and will vary in the way the buffer solution is applied to the meat giving a pH below neutral. Szczesniak, et al., U.S. Pat. No. 4,075,357 issued Feb. 21, 1978, teaches salt combined with a secondary salt selected from alkali metal salts of organic acids and trisodium orthophosphate, polyphosphate, metaphosphate and ultraphosphate. Citrates are preferred combined with sodium chloride. These mixtures are used to control water activity in low moisture cooked food which have neutral pH.

U.S. Pat. No. 3,705,040 to Bynagte issued Dec. 5, 1972 teaches use of a solution of water, 2 to 3% acid pyrophosphates and 2 to 15% sodium phosphates including sodium orthophosphate to soak shrimp for at least two minutes followed by cooking for three minutes, cooling and peeling. The process improves the amount of shrimp meat recovered from the shell by reducing the strength of the under skin of the shrimp. Where sodium orthophosphate is employed in Example IV it is employed at 2%.

The preceding patents which pump or treat meat or fish with phosphates generally use needles to inject or mix into meat formulations a phosphate solution to bind water and improve texture of the product. Neutral pH formula are employed for these purposes. The patents do not teach the present invention of treating the surface of freshly slaughtered poultry with trialkali metal orthophosphate at pH 11.5 or greater to remove, reduce or retard bacterial contamination or growth on the poultry.

U.S. Pat. No. 4,592,892 to Ueno, et al. issued Jun. 3, 1986 teaches ethanol used to sterilize foods and machines can be enhanced by use of an aqueous solution of an alkali carbonate which may also contain a trialkali metal phosphate. Trialkali metal orthophosphate as well as sodium carbonate and other phosphates is used to treat a broth to reduce *E. coli* in Table 1. This patent fails to recognize that trisodium phosphate per se can remove, reduce or retard bacterial contamination on poultry. Orthophosphate is used only in combination with ethanol which is a popular disinfectant for machinery and food in Japan. Thomson, et at. "Phosphate and Heat Treatments to Control Salmonella and Reduce Spoilage and Rancidity on Broiler Carcasses," *Poultry Science*, 1979, pp. 139–143, treats poultry with 6% kena phosphate which is a polyphosphate blend of 90% sodium tripolyphosphate and 10% sodium hexametaphosphate. The phosphates did not significantly or consistently affect salmonella survival or total bacterial growth.

It is known that the shelf-life of chicken carcasses can be increased 1 to 2 days by chilling the poultry in a solution of 6% sodium tripolyphosphate/0.7% tetrasodium pyrophosphate (Kena-available from of Rhône-Poulenc Inc.). See, *The Antimicrobial Effect Of Phosphate With Particular Reference To Food Products*, L. L. Hargreaves, et al., The British Food Manufacturing Industries Research Association, Scientific and Technical Surveys, No. 76, April 1972, pp. 1–20 at page 12. Many patents and articles suggest the use of polyphosphates in preserving meat and fish products.

In addition, it is also stated in the Hargreaves reference at page 7 that G. Pacheco and V. M. Dias in an article entitled *Bacteriolytic Action of Phosphates* Mems Institute, Oswaldo Cruz, 52 (2), pp. 405–414, reported on the bacteriolytic action of solutions of monosodium, disodium, trisodium and dipotassium orthophosphates on dead and living cells of *Salmonella typhosa, Escherichia coli and Staphylococcus aureus*. Trisodium phosphate dodecahydrate is stated to have the greatest lytic action. This reference does not relate to treating poultry.

British Patent 935,413 teaches treating raw poultry in the chill tank with a non-cyclic polyphosphate. It is taught that this method provides increased preservation of the poultry flesh by decreasing exudate and thereby decreasing spread of bacteria.

U.S. Pat. No. 5,264,229 suggests shelf-life extension for commercially processed poultry by using a specialized hydrogen peroxide and a surfactant in the water used for chilling the poultry.

Commonly assigned U.S. Pat. Nos. 5,069,922, 5,143,260 and 5,283,073 are directed to a poultry carcass wash process which removes or reduces existing salmonella contamination as well as retards further contamination or growth without affecting the organoleptic properties of the poultry carcasses. While this technology has significantly has advanced the art, improvements can still be made in reducing the overall aerobic bacterial plate count, and thereby increasing the shelf-life of the poultry.

SUMMARY OF THE PRESENT INVENTION

In accordance with the present invention, there is provided a process for treating poultry carcasses to reduce the overall aerobic bacterial count and thereby increase shelf-life (i.e., customary commercial shelf-life). No interference with the taste or appearance of the final product is associated with the inventive process. The shelf-life increase can range from about one to about fourteen days.

It has been discovered that during poultry processing from about 4% or more, preferably 8% or more of trialkali metal orthophosphate may be added to processing water before the poultry is chilled to elevate the treating solution to above pH 11.5 and remove, reduce or retard bacterial contamination and/or growth on poultry.

We prefer to employ the trialkali orthophosphate treatment immediately after the scalding treatment either before or after defeathering or during washing of the poultry prior to evisceration or preferably during the inside/outside wash after evisceration. These treatments are conducted using a warm or hot solution and recycling the solution with filtering to economically utilize the phosphate. While our prior work suggests that a reduction in bacteria can occur by treating the poultry either before or after chilling the carcass, we have surprisingly discovered that treating the carcass before chilling dramatically reduces the overall bacterial plate count and extends the shelf-life of the poultry.

The process comprises treating poultry at a temperature below that which would cause organoleptic depreciation in the poultry which normally is below 65° C., preferably below 45° C. Cooled poultry is treated below about 27° C. The treatment solution comprising trialkali metal orthophosphates, said orthophosphate being present in an amount and said poultry being treated for a time sufficient to remove, reduce, or retard bacteriological contamination of the poultry, said orthophosphate agent being present in amounts insufficient to cause substantial organoleptic depreciation of the poultry. Such treatment solutions have a pH above 11.5.

It is possible but not necessary to treat the poultry, including eviscerated and defeathered poultry, with a blend of a major amount of trialkali metal orthophosphate and a corresponding minor amount of a basic agent, said blend being present in an amount and said poultry being treated for a time sufficient to remove, reduce or retard bacteriological contamination and/or growth on the poultry. The basic agent is used in the blend in amounts insufficient to cause substantial organoleptic depreciation of the poultry. The treatment solution has a pH above 11.5. The trialkali metal orthophosphate is always present per se or in a major amount of the treatment solution with the proviso that alcohol and ascorbic acid are never part of the treatment solution. Preferably, the treatment time is longer than about 5 minutes, if a dip solution application is used, although much shorter times have been found effective. We prefer to use the trialkali metal orthophosphates per se. In any case, from about 4% or more orthophosphate is used before chilling the poultry.

Specifically, it has been discovered that poultry can be treated with a solution containing from about 4% to about saturation of orthophosphate in the aqueous solution. Preferably, about 4% to about 12% and most preferably about 8% or more trisodium or tripotassium orthophosphate dodecahydrate or an equivalent amount of the anhydrous compound, is effective. It has been found that treatment with the trisodium or tripotassium orthophosphate gave essentially the same effectiveness as sodium hydroxide or phosphoric acid/sodium hydroxide without the adverse effects on the meat or skin which accompany the use of the sodium hydroxide or phosphoric acid/sodium hydroxide blend.

By the use of this process, poultry carcasses can be washed economically and simply with food grade products to achieve bacteria reduction without organoleptic depreciation of the carcass. In addition, the shelf-life of the final product can be increased by between about one and about fourteen days. Phosphate salts can remain on the poultry surface to provide a surface less conducive to supporting bacterial growth, particularly in the highly irregular surfaces of the skin without fear of carcass degradation or impairment of flavor.

Other benefits will become apparent from the description which follows.

DETAILED DESCRIPTION OF THE INVENTION

Trialkali metal phosphate is an orthophosphate salt of the formula $R_3PO_4$ with a formula for the sodium salt being $Na_3PO_4$ and an equivalent formula for the tripotassium compounds. R is an alkali metal of sodium or potassium. Trisodium phosphate has a minimum of 41.5% $P_2O_5$ and a typical pH in a 1% solution of about 11.8.

Trisodium phosphate is also available as the dodecahydrate of the formula:

$$Na_3PO_4 \cdot 12H_2O$$

In commerce, the dodecahydrate is available in a technical grade with a formula of:

$$5(Na_3PO_4 \cdot 12H_2O)NaOH;$$

or in the food grade with a formula of:

$$4(Na_3PO_4 \cdot 12H_2O)NaOH;$$

Both forms have a typical pH in 1% solution of 11.8. Preferably, the trisodium phosphate dodecahydrate (either form) is used. As used herein, trisodium phosphate is intended to include tripotassium phosphate as well as all forms of those compounds. Food grade products are intended to be used for food uses.

This invention is applicable to all types of poultry including chickens, turkeys, geese, capon, cornish hens, squab, ducks, guinea, fowl and pheasants. By poultry or carcass, it is intended to cover whole birds as well as parts.

The application of an aqueous trialkali orthophosphate solution of pH greater than 11.5 is made before chilling the carcass. We prefer to employ the orthophosphate solution in a manner which allows recovery of the solution after treating the poultry. The recovered solution is then filtered to remove insolubles and water and trialkali metal orthophosphate are added to maintain the concentration at an effective amount to remove, reduce or retard bacteriological contamination of the poultry. The poultry can either be subjected to contact with the treatment solution in a trough or may be subjected to solution sprayed inside and outside the poultry.

It is possible to employ a trough through which the poultry is transported by chain shackles or a spray through nozzles for from several seconds to minutes. Residual treatment solution remains after the actual contact with the poultry and such residual solution is further effective in removing, reducing or retarding bacterial contamination and/or growth.

While treatment can be conducted at various places in the poultry treatment process we prefer several places where we can minimize the quantity of treatment solution employed, minimize the treatment time to that effective to produce the desired removal, reduction or retardation of bacteriological growth and/or contamination of the poultry. After scalding the poultry during feather removal we have found we may treat the poultry in a trough for a minimum of several seconds at a temperature of about 20° to 60° C. prior to the singe step of processing. This helps reduce bacterial contamination. The treatment solution is removed in the subsequent washing step prior to evisceration. While it is possible to treat with orthophosphate during washing, the large quantity of water employed and regulations regarding the recycling of wash water preclude economical treatment. However, treatment is possible either directly after washing and before evisceration or after evisceration preferably employing a spray treatment solution or drench system at a temperature between 20° to 45° C. When treating after evisceration, it is possible to spray the treatment solution on the outside as well as the inside of the eviscerated poultry or to drench the entire carcass into a bath of treatment solution.

Treatment can take several seconds or longer with the treatment solution remaining on the poultry until its introduction into the chill tank. After treatment, the carcasses maybe rinsed with water prior to chilling. The treatment solution is then recovered and recycled while solids are removed using filters and make up water and phosphate added to maintain orthophosphate concentration.

We have found that trace amounts of the treatment solution can remain on the poultry (a few hundredths of a percent) to further remove, reduce or retard bacterial contamination and/or growth of the poultry. Further treatments can be made after chilling the birds and when cutting and prior to packaging of the poultry using either a spray or dip process.

We have found that anywhere from one second to two hours of treatment is effective in removing, reducing or retarding bacterial contamination, particularly salmonella on poultry. The time need only be an effective amount of time to produce the desired result and can easily be determined for this particular point in the process where treatment is conducted. By utilizing the pre-chill treatment, the shelf-life of the final product may be extended by between about one and about fourteen days, with an extension of between about three and about five days being typical.

Equipment for recycling and removing solids is generally available from manufacture of meat pickling equipment. In general a rotary filter manufactured by Townsend of Des Moines, Iowa can be used to remove large particles while a screening system also available from Townsend can be used for smaller particle removal. The equipment should be made of stainless steel, plastic or other material resistant to the corrosive action of trialkali metal orthophosphate and acceptable for use in processing food.

We prefer to employ saturated solutions of the orthophosphate which are highly effective in removing, reducing or retarding bacterial contamination. Saturated solutions of up to 40% are possible but usually from about 4%, preferably about 8% or 10% or greater of trisodium orthophosphate is effective. The phosphate may be combined with other materials if desired with the proviso that alcohols (ethanol or the like) and reducing agents like ascorbic acid are not employed. In other words the treatment solution does not contain alcohol. We do not employ any antibacterial which is detrimental to the organoleptic properties of the poultry such as high concentrations of sodium hydroxide or other harsh alkali or alcohol. We prefer to employ the trialkali metal phosphate per se to treat the carcass. Dispersions of orthophosphate can be used but appear to have little advantage over use of a solution for treating the carcass.

Where the chicken is additionally treated just prior to packaging, it is possible to treat with orthophosphate combined with other materials so long as alcohol is not present. In processing before or after evisceration but before cutting, we prefer to employ trialkali metal orthophosphate per se or at least with the proviso that alcohol is not employed.

In spraying the treatment solution on the poultry we employ from 20 to 150 psi to cause a spray of medium particle size to impact the inside and outside of the poultry with sufficient force for good cleaning without any depreciation on the appearance or taste of the poultry.

When treatment of the poultry occurs after defeathering and eviscerating, the carcass is washed with water or other acceptable cleaning solutions. Agitation, sonification and other mechanical means can be applied to assist in washing. Preferably, the carcass is then treated with a treatment solution containing from about 4% to about 12% and preferably from about 6% to about 12% and most preferably about 8% to about 12% by weight trialkali metal orthophosphate based on the weight of the solution.

The carcasses can be dipped in the treatment solution. If so, the carcass or the solution is preferably agitated to insure a good flow of the treatment solution over all surfaces and in all crevices of the carcass. The treatment solution can also be applied by mechanical sprayers, preferably under high pressure to insure good contact. Sonification may be employed at either sonic or ultrasonic frequencies. Any other means of contacting the poultry with the treatment solution, such as in a rotating drum, can also be used. The poultry, optionally rinsed with water, is then forwarded for the usual chill tank treatment. The treatment solution preferably contains only trialkali metal orthophosphate. The treatment solution does not contain alcohol.

The treatment solution is preferably comprised only of trialkali metal orthophosphate. For purposes of adjusting pH, minor amounts of other agents can also be added. These can be illustrated by sodium carbonate, sodium and/or potassium hydroxide, alkali metal polyphosphate such as, sodium tripolyphosphate or acids such as phosphoric acid. Since hydroxides have an adverse effect on the organoleptic characteristics of the poultry flesh, it is preferred to avoid the use of these basic agents altogether or to use amounts which have no effect on the organoleptic characteristics of the poultry flesh. The basic agent, if used, is used in an amount insufficient with the alkali metal orthophosphate to cause organoleptic deterioration of the poultry flesh. By "minor amounts" is meant less than 50% by weight of the combined dry weight of the trialkali metal orthophosphate and the basic agent usually up to 45% and in all cases in an amount insufficient to cause organoleptic deterioration.

The ingredients in the treatment solution are used in amounts sufficient to provide a pH of above about 11.5 and preferably within the range from about 11.6 to about 13.0. The pH level insures the treatment solution will remove, reduce or retard bacterial contamination or growth. We prefer to employ equipment which recycles the solution for economy, filters solids from the recycled solution for cleanliness, adds make up water to maintain the solutions volume and adds trialkali metal orthophosphate to maintain a saturated or near saturated solution. While a saturated solution insures maximum concentration of the phosphate, we have found that concentrations of about 4% to saturation and more particularly about 8% to near saturation are desirable. At cooler temperatures, below 27° C. and 10° C. a solution containing about 4% to about 12% trialkali metal orthophosphate and more preferably about 6% or more and most preferably about 8% or more is effective to reduce, remove or retard contamination and/or growth of all bacteria. At all levels of about 4% or more trialkali orthophosphate, the pH will remain above about 11.5 and preferably from pH 11.6 to about 13.5, most preferably 12.0 to 13.5.

The poultry carcasses are contacted with the treatment solution for a period of time sufficient to reduce total aerobic bacterial contamination over and above that obtainable with pure water at temperatures ranging from about 20° C. to 60° C., and more preferably between about 24° C. and about 40° C. Treatment dwell time is also sufficient, under the conditions of the treatment, to contact all contactable exposed surfaces of the poultry carcasses, effect a washing of the surfaces and thus contact substantially all colony forming units on the surface of the poultry. The contact time is sufficient to allow upon drying, the deposition of an even layer of trialkali metal orthophosphate on the exposed surfaces of the poultry to prevent or retard further bacterial growth.

At atmospheric pressure, in a dip tank, dwell times ranging from a few seconds such as two or more seconds after the scald tank and after about 30 seconds to about 30 minutes where processing conditions permit have been found to be effective. Dwell times can be reduced using a pressure spray. Longer dwell times can be used if the solution concentration is not excessive.

Pressure spraying is particularly useful when both the inside and outside of the eviscerated poultry can be treated. We employ a rotating nozzle for the inside spray and insert the nozzle fully into the cavity resulting from evisceration so that all parts of the exposed flesh, tissue and bone is contacted with a spray of treatment solution. Outside sprays are designed to cover the total outside of the poultry. When treatment is employed after poultry pieces are cut, we employ a spray to cover all surface area. Where possible we allow the treatment solution to remain on the poultry to further reduce, remove or retard bacterial contamination and/or growth. Often we allow the solution to dry on the poultry to further reduce, remove or retard bacterial growth.

The spray is propelled using from 20 to 150 psi pressure through spray nozzles designed to vigorously wash the surface without damaging the meat.

When using dip tanks or troughs the poultry is generally pulled through the solution using a chain and shackle system. Although this method, which permits the phosphate treatment solution to contact the entire poultry surface is suitable, agitation in such tanks will improve contact of poultry and solution and normally reduces the time of contact required for good results.

Immediately after treatment, the poultry can be processed following normal processing conditions such as draining and chilling. A unique feature of the invention is the ability to allow the trialkali metal phosphate to dry on the surface of the poultry without the need to wash.

While it is possible to treat the poultry at any point in the process before chilling and at any temperature and time which does not harm the product, we have identified several areas where we believe the treatment will be most effective. One or more treatments with the alkali metal orthophosphate during processing are possible and often desirable. Any treatment temperature from 0° to 70° C. for process times of several seconds to hours depending on the temperature is feasible.

After scalding and before defeathering, treatment provides a means of washing undesired contamination including bacterial contamination from the poultry as well as providing a coating of treatment solution on the poultry as it is exposed to defeathering where further bacterial contamination can occur. This treatment is conducted at 40° to 70° C., preferably 45° to 65° C. for a short period of time.

It is also possible to treat the poultry after defeathering and before evisceration although we prefer to treat evisceration where both the inside and outside of the poultry may be thoroughly sprayed with treatment solution at 20° to 40° C., preferably 25 to 35° C. Particularly good results are obtained by first applying a treatment solution on all portions of the poultry carcass, allowing the treatment solution to remain on the carcass for up to one minute, and then rinsing with water for up to another minute. The carcasses are then chilled.

While the present invention is primarily directed at reducing salmonella contamination of the poultry, it is also intended to include all aerobic bacterial growth which is affected by the stated trialkali metal orthophosphates. In addition to salmonella, other bacteria which are measured by total plate count are significantly reduced. Because of the high reduction of total aerobic bacteria, the shelf-life of the poultry can be reduced by between about one and about fourteen days.

Affected bacterial species can be easily determined by one of ordinary skill and thus all such bacteria as are affected are considered included in the invention.

The present invention will be illustrated in the Example which follows.

EXAMPLE

Eviscerated and defeathered turkeys are subject to one of three treatments to determine the effect these treatments have upon the reduction of aerobic bacteria, and in turn, an increase in the shelf-life of the turkeys. The treatment conditions are as follows:

[A] no treatment

[C] the birds are drenched in a treatment solution for 15–30 seconds containing a concentration of 10% trisodium orthophosphate (AVGARD® brand TSP, Rhône-Poulenc Inc.) at a temperature of 75° F. (24° C.)

[C'] 20 seconds after contact with trisodium orthophosphate in accordance with treatment C, the birds are further rinsed with water for about 10 seconds.

These treatment conditions all occur prior to the turkeys being chilled. Samples of each of the turkeys are analyzed microbiologically for the following types of bacteria: aerobic plate count, enterobacteriaceae, *E. coli* and salmonella.

The tests are conducted for two consecutive days. The results from the Day One testing are shown in Tables 1, 2 and 3 and the results from the Day Two testing are shown in Tables 4, 5 and 6.

TABLE 1

| SAMPLE | | | *E. coli* Col/gm | | |
|---|---|---|---|---|---|
| # A | APC Col/gm | ENTEROBAC Col/gm | VRBA + MUG Presumpt. | E.C. + MUG Confirmed | SALMON ELLA |
| 1 | 1000 | 40 | 30 | 30 | POSITIVE |
| 2 | 32000 | 1040 | 800 | 800 | POSITIVE |
| 3 | 9000 | 130 | 80 | 80 | POSITIVE |
| 4 | 6000 | 90 | 10 | <10 | Neg |
| 5 | 13000 | 190 | 90 | 90 | Neg |
| 6 | 10000 | 680 | 520 | 520 | POSITIVE |
| 7 | 9000 | 100 | 30 | 30 | Neg |
| 8 | 18000 | 110 | 30 | 30 | Neg |
| 9 | 11000 | 720 | 360 | 360 | Neg |
| 10 | 9000 | 80 | 70 | <10 | Neg |
| 11 | 24000 | 100 | 90 | 30 | Neg |

TABLE 1-continued

| SAMPLE | | | E. coli Col/gm | | |
|---|---|---|---|---|---|
| # A | APC Col/gm | ENTEROBAC Col/gm | VRBA + MUG Presumpt. | E.C. + MUG Confirmed | SALMON ELLA |
| 12 | 12000 | 160 | 190 | 190 | Neg |
| 13 | 8000 | 60 | 50 | 50 | Neg |
| 14 | 9000 | 190 | 170 | 170 | Neg |
| 15 | 6000 | 150 | 90 | 60 | Neg |
| 16 | 16000 | 50 | 20 | 20 | Neg |
| 17 | <1000 | 100 | 20 | <10 | Neg |
| 18 | 6000 | 140 | 130 | 130 | Neg |
| 19 | 2000 | 50 | 50 | 50 | Neg |
| 20 | 20000 | 440 | 720 | 720 | Neg |
| 21 | 11000 | 300 | 90 | 90 | Neg |
| 22 | 22000 | 120 | 110 | 110 | Neg |
| 23 | 9000 | 100 | 80 | 40 | Neg |
| 24 | 2000 | 50 | 40 | 40 | Neg |
| 25 | 12000 | 170 | 120 | 120 | Neg |
| 26 | 16000 | 180 | 130 | 130 | POSITIVE |
| 27 | 15000 | 440 | 80 | 40 | Neg |
| 28 | 22000 | 120 | 190 | 190 | Neg |
| 29 | 10000 | 320 | 180 | 180 | Neg |
| 30 | 10000 | 160 | 150 | 50 | Neg |

TABLE 2

| SAMPLE | | | E. coli Col/gm | | |
|---|---|---|---|---|---|
| # C | APC Col/gm | ENTEROBAC Col/gm | VRBA + MUG Presumpt. | E.C. + MUG Confirmed | SALMON ELLA |
| 1 | 2000 | <10 | <10 | — | Neg |
| 2 | 2400 | <10 | <10 | — | Neg |
| 3 | 700 | <10 | <10 | — | Neg |
| 4 | 2400 | <10 | <10 | — | Neg |
| 5 | 700 | <10 | <10 | — | Neg |
| 6 | 500 | <10 | <10 | — | Neg |
| 7 | 800 | <10 | <10 | — | Neg |
| 8 | 3000 | <10 | <10 | — | Neg |
| 9 | 1100 | <10 | <10 | — | Neg |
| 10 | 300 | <10 | <10 | — | Neg |
| 11 | 2600 | <10 | <10 | — | Neg |
| 12 | 6000 | <10 | <10 | — | Neg |
| 13 | 3200 | <10 | <10 | — | Neg |
| 14 | 1300 | <10 | <10 | — | Neg |
| 15 | 6400 | <10 | <10 | — | Neg |

TABLE 3

| SAMPLE | | | E. coli Col/gm | | |
|---|---|---|---|---|---|
| # C' | APC Col/gm | ENTEROBAC Col/gm | VRBA + MUG Presumpt. | EC + MUG Confirmed | SALMON ELLA |
| 1 | <100 | <10 | <10 | — | Neg |
| 2 | 400 | <10 | <10 | — | Neg |
| 3 | <100 | <10 | <10 | — | Neg |
| 4 | <100 | <10 | <10 | — | Neg |
| 5 | <100 | <10 | <10 | — | Neg |
| 6 | 600 | <10 | <10 | — | Neg |
| 7 | 1300 | <10 | <10 | — | Neg |
| 8 | <100 | <10 | <10 | — | Neg |
| 9 | <100 | <10 | <10 | — | Neg |
| 10 | 200 | <10 | <10 | — | Neg |
| 11 | 300 | <10 | <10 | — | Neg |
| 12 | <100 | <10 | <10 | — | Neg |
| 13 | <100 | <10 | <10 | — | Neg |

TABLE 3-continued

| SAMPLE # C' | APC Col/gm | ENTEROBAC Col/gm | E. coli Col/gm | | SALMON ELLA |
|---|---|---|---|---|---|
| | | | VRBA + MUG Presumpt. | EC + MUG Confirmed | |
| 14 | 2700 | <10 | <10 | — | Neg |
| 15 | 5400 | <10 | <10 | — | Neg |

TABLE 4

| SAMPLE # A | APC Col/gm | ENTEROBAC Col/gm | E. coli Col/gm | | SALMON ELLA |
|---|---|---|---|---|---|
| | | | VRBA + MUG Presumpt. | E.C. + MUG Confirmed | |
| 31 | 4000 | 280 | 140 | 140 | POSITIVE |
| 32 | 4000 | 130 | 70 | 70 | POSITIVE |
| 33 | 5000 | 360 | 220 | 220 | Neg |
| 34 | 10000 | 100 | 50 | 50 | POSITIVE |
| 35 | 11000 | 110 | 150 | 150 | Neg |
| 36 | 26000 | 520 | 440 | 440 | POSITIVE |
| 37 | 5000 | 240 | 240 | 240 | POSITIVE |
| 38 | 11000 | 1160 | 520 | 520 | Neg |
| 39 | 9000 | 2480 | 1520 | 1520 | Neg |
| 40 | 2000 | 220 | 100 | 50 | Neg |
| 41 | 12000 | 170 | 260 | 260 | Neg |
| 42 | 10000 | 230 | 110 | 50 | Neg |
| 43 | 36000 | 1720 | 1280 | 1280 | Neg |
| 44 | 13000 | 260 | 170 | 170 | Neg |
| 45 | 9000 | 250 | 160 | 50 | Neg |
| 46 | 8000 | 1400 | 640 | 640 | Neg |
| 47 | 21000 | 960 | 80 | 80 | POSITIVE |
| 48 | 14000 | 500 | 680 | 680 | Neg |
| 49 | 15000 | 820 | 960 | 960 | Neg |
| 50 | 34000 | 250 | 150 | 100 | Neg |
| 51 | 8000 | 100 | 90 | 30 | Neg |
| 52 | 76000 | 360 | 230 | 230 | Neg |
| 53 | 15000 | 160 | 120 | 120 | Neg |
| 54 | 11000 | 50 | 60 | <10 | Neg |
| 55 | 64000 | 1420 | 1040 | 1040 | Neg |
| 56 | 116000 | 920 | 500 | 250 | Neg |
| 57 | 26000 | 280 | 260 | 160 | Neg |
| 58 | 4000 | 360 | 320 | 320 | Neg |
| 59 | 18000 | 320 | 160 | 160 | Neg |
| 60 | 6000 | 280 | 220 | 220 | Neg |

TABLE 5

| SAMPLE # C | APC Col/gm | ENTEROBAC Col/gm | E. coli Col/gm | | SALMON ELLA |
|---|---|---|---|---|---|
| | | | VRBA + MUG Presumpt. | E.C. + MUG Confirmed | |
| 16 | 600 | <10 | <10 | — | Neg |
| 17 | 1800 | <10 | <10 | — | Neg |
| 18 | 1600 | <10 | <10 | — | Neg |
| 19 | 5400 | <10 | <10 | — | Neg |
| 20 | 1200 | <10 | <10 | — | Neg |
| 21 | 2800 | <10 | <10 | — | Neg |
| 22 | 3200 | <10 | <10 | — | POSITIVE |
| 23 | 300 | <10 | <10 | — | Neg |
| 24 | 2400 | <10 | <10 | — | Neg |
| 25 | 11200 | <10 | <10 | — | Neg |
| 26 | 2800 | <10 | <10 | — | Neg |
| 27 | 4800 | <10 | <10 | — | Neg |
| 28 | <100 | <10 | <10 | — | Neg |
| 29 | 11200 | <10 | <10 | — | Neg |
| 30 | 3200 | <10 | <10 | — | Neg |

TABLE 6

| SAMPLE | | | E. coli Col/gm | | |
|---|---|---|---|---|---|
| # C' | APC Col/gm | ENTEROBAC Col/gm | VRBA + MUG Presumpt. | E.C. + MUG Confirmed | SALMON ELLA |
| 16 | 1400 | <10 | <10 | — | Neg |
| 17 | 2200 | <10 | <10 | — | Neg |
| 18 | 900 | <10 | <10 | — | Neg |
| 19 | 500 | <10 | <10 | — | Neg |
| 20 | <100 | <10 | <10 | — | Neg |
| 21 | 1400 | <10 | <10 | — | Meg |
| 22 | <100 | <10 | <10 | — | Neg |
| 23 | 800 | <10 | <10 | — | Neg |
| 24 | 2500 | <10 | <10 | — | Neg |
| 25 | <100 | <10 | <10 | — | Neg |
| 26 | 2800 | <10 | <10 | — | Neg |
| 27 | <100 | <10 | <10 | — | Neg |
| 28 | 1800 | <10 | <10 | — | Neg |
| 29 | 500 | <10 | <10 | — | Neg |
| 30 | 2400 | <10 | <10 | — | Neg |

The Treatment A data for Day One are typical and exhibit a 17% (5/30) incidence rate for Salmonella. In contrast, the treated samples identified as [C] are all negative for Salmonella, as well as *E. coli* and enterobacteriaceae. In addition, these samples exhibit reduced Aerobic Plate Counts by about one log order of magnitude. The sample identified as [C'] (drench/rinse) have the same negative incidence for Salmonella, *E. coli* and Enterobacteriaceae. It is noted that the Aerobic Plate Counts are further reduced by the rinse after treatment, such that the incidence rate at the level of detection for samples evaluated in this group is reduced to 47% (8/15). This lower order of magnitude for Aerobic Hate Count is further evidence of the effect of a prechill drench/rime paradigm. This reduction can translate into a shelf-life extension ranging from about one to about fourteen days.

Similarly, on Day Two the untreated samples identified as [A] exhibit a Salmonella incidence rate of 20%, or 6 out of 30. The subsample identified as [C] are taken as in the prior day one minute from contact time, after drainage, exhibits one positive out of 15. There is a rationale for this positive, namely the potential for cross contamination with untreated carcasses. However, the *E. coli* and Enterobacteriaceae levels are all negative for this group, and the Aerobic Plate Counts are also similarly reduced.

Lastly, the subsamples identified as [C'] are all negative for Salmonella, *E. coli* and Enterobacteriaceae, with a similar reduction in terms of negatives for Aerobic Plate Count at the level of detection of 100 colonies per gram. In this instance there are 4 out of 15 negative, or a 26.6% incidence reduction in Aerobic Plate Counts. Again, this can translate into an increased shelf-life of from one to fourteen days.

These data, therefore, dramatically demonstrate the optimum effectiveness of the trisodium orthophosphate treatment, namely a drench only system either alone, or with a post drench water rinse to further reduce to the lowest level possible the incidence of pathogens on these treated carcasses.

Having described the invention in detail and by reference to the preferred embodiments thereof, it will be apparent that modifications and variations are possible without departing from the scope of the appended claims.

What is claimed is:

1. A process for treating poultry carcasses consisting essentially of contacting the poultry carcasses, prior to chilling, with an aqueous treatment solution containing about 4% or greater trialkali metal orthophosphate based on the weight of the solution, said treatment solution having a pH of above 11.5, said treatment being conducted for a period of time effective to reduce the overall aerobic bacterial count without causing organoleptic depreciation of the poultry and thereby increase the shelf-life of the poultry.

2. The process of claim 1 wherein the amount of said phosphate is about 8% or greater based on the weight of the solution.

3. The process of claim 2 wherein said orthophosphate is trisodium orthophosphate.

4. The process of claim 1 wherein said pH ranges from about 12.0 to about 13.5.

5. The process of claim 1 wherein said poultry carcasses are treated at a temperature between about 0° C. and about 70° C.

6. The process of claim 5 wherein said poultry carcasses are treated at a temperature between about 20° C. and about 45° C.

7. The process of claim 1 wherein said poultry carcasses are treated by dipping in said solution or spraying said solution thereon for between about one second to about two hours.

8. The process of claim 1 wherein said aqueous treatment solution further includes up to 50% of basic agent present in amounts insufficient to cause organoleptic depreciation of the poultry, said basic agent being selected from the group consisting of sodium hydroxide, potassium hydroxide, sodium carbonate, potassium carbonate, sodium tripolyphosphate and mixtures thereof.

9. A process for treating poultry carcasses consisting essentially of contacting the surface of poultry carcasses, prior to chilling, with an aqueous treatment solution consisting essentially of 4% or greater trialkali metal orthophosphate based on the weight of the solution, said treatment solution having a pH of above 11.5, said treatment being conducted for a period of time effective to reduce the overall aerobic bacterial count without causing organoleptic depreciation of the poultry and thereby increase the shelf-life of the poultry.

10. The process of claim 9 wherein said orthophosphate is trisodium orthophosphate.

11. The process of claim 9 wherein said aqueous treatment solution further includes up to 50% of basic agent present in amounts insufficient to cause organoleptic depreciation of the poultry, said basic agent being selected from the group consisting of sodium hydroxide, potassium hydroxide, sodium carbonate, potassium carbonate, sodium tripolyphosphate and mixtures thereof.

* * * * *